(12) United States Patent
Brandle, Jr. et al.

(10) Patent No.: US 6,733,587 B2
(45) Date of Patent: May 11, 2004

(54) PROCESS FOR FABRICATING AN ARTICLE COMPRISING A MAGNETO-OPTIC GARNET MATERIAL

(75) Inventors: Charles David Brandle, Jr., Basking Ridge, NJ (US); Vincent Jerome Fratello, Basking Ridge, NJ (US); Kathleen M. Paget, Hillsborough, NJ (US); Shanthi Subramanian, Somerset, NJ (US)

(73) Assignee: TriQuint Technology Holding Co., Hillsboro, OR (US)

( * ) Notice: Subject to any disclaimer, the term of this patent is extended or adjusted under 35 U.S.C. 154(b) by 0 days.

(21) Appl. No.: 10/091,002

(22) Filed: Mar. 5, 2002

(65) Prior Publication Data

US 2003/0072870 A1 Apr. 17, 2003

Related U.S. Application Data

(60) Provisional application No. 60/327,415, filed on Oct. 5, 2001.

(51) Int. Cl.$^7$ .............................................. C30B 24/02
(52) U.S. Cl. ........................................ 117/84; 117/54
(58) Field of Search ..................................... 117/54, 84

(56) References Cited

U.S. PATENT DOCUMENTS

| | | | | |
|---|---|---|---|---|
| 5,303,256 A | * | 4/1994 | Sumida | ................... 372/106 |
| 5,608,570 A | | 3/1997 | Brandle, Jr. et al. | ........ 359/321 |
| 5,801,875 A | | 9/1998 | Brandle, Jr. et al. | ........ 359/321 |

OTHER PUBLICATIONS

V.J. Fratello, et al "Nucleation Induced Coercivity In Faraday Rotator Garnets", Proceedings of International Symposium on Laser and Nonlinear Optical Material, 1997, T. Sasaki, editor, pp. 59–66.

D. Mateika, et al "Lattice Parameters And Distribution Coefficients As Function OF Ca, Mg And Zr concentrations In Czochralski Grown Rare Earth Gallium Garnets", Journal of Crystal Growth, vol. 56, pp. 677–689, Jul. 22, 1981.

V.J. Fratello, et al Innovative Improvements In Bismuth–Doped Rare–Earth Iron Garnet Faraday Rotators, IEEE Transactions On Magnetics, vol 32, No. 5, pp. 4102–4107, Sep. 1996.

V.J. Fratello, et al "Epitaxial Garnet Films for Nonreciprocal Magneto–Optic Devices", Handbook of Thin Film Devices, vol. 4: Magnetic Thin Fil Devices, ed. M.H. Francombe, Academic Press, pp. 93–141.

V.J. Fratello, et al Journal of Applied Physics, vol. 60, pp718–720, Jul. 15, 1986.

edited by W.H. von Aulock, "Handbook of Microwave Ferrite Materials", Academic Press 1965 pp. 70–73, 86, 153, 163, 174.

(List continued on next page.)

*Primary Examiner*—Felisa Hiteshew
(74) *Attorney, Agent, or Firm*—Dickstein Shapiro Morin & Oshinsky LLP

(57) ABSTRACT

Improvements in the production of high-performance latching magneto-optic garnet materials are provided. It has been recognized that high-Europium magneto-optic garnets will offer superior properties in devices such as isolators, circulators and interleavers. However, formation of, e.g., (BiEu)$_3$(FeGa)$_5$O$_{12}$ on conventional, congruent composition, garnet substrates is difficult, due to poor lattice matching between the magneto-optic garnet and such conventional substrates. The invention addresses this problem, by utilizing a single crystal substrate composed essentially of a solid solution of two or more garnet materials. By use of a solid solution of two or more garnets, e.g., two congruent garnet compositions, an acceptable lattice parameter is able to be attained. Useful solid solutions include gadolinium scandium gallium garnet and gadolinium scandium aluminum garnet, or gadolinium scandium gallium garnet and terbium scandium gallium garnet.

21 Claims, 3 Drawing Sheets

OTHER PUBLICATIONS edited by A. Paoletti, "Physics of Magnetic Garnets", North Holland, 1978, pp. 9–22; and J. Smit and H.P.J. Wijn, 1959, pp. 212–215.

P. Hansen et al, Landolt–Bornstein New Series, Group III, vol. 12, Part A, Springer–Verlag, 1978, pp. 22–23.

W.P. Wolf, Phys. Rev., vol. 118, p. 1490 (1960).

V.J. Fratello et al, "Growth of Single–Crystal . . . ", Reprinted from Journal of Crystal Growth, vol. 75, pp. 281–283, North–Holland, Amsterdam, Jan. 16, 1986.

V.J. Fratello et al, "Growth of Congruently Melting Gadolinium Scandium Gallium Garnet", Journal of Crystal Growth, vol. 80, pp 26–32, North–Holland, Amsterdam, (1987).

V.J. Fratello et al, "Effect of Bismuth Doping on Thermal Expansion and Misfit Dislocations in Epitaxial Iron Garnets", Journal of Crystal Growth, vol. 142, pp. 93–102, (1994).

H.L. Huang, editor, Proceedings of the Fifth Symposium on Magnetism and Magnetic Materials, "Recent Advances in Magnetism and Magnetic Materials", Taipei, Taiwan, Apr. 19–20, 1989.

C.D. Brandle et al, "Crystal Stoichiometry and Growth of Rare–Earth Garnets Containing Scandium", vol. 20, Journal of Crystal Growth, pp. 1–5, (1973).

S. Yu. Zinov'ev, "Determination of Optimal Composition For Growth of Gadolinium–Scandium–Aluminum Garnet", Plenum Publishing Corporation, (1990).

G.B. Lutts, "Crystals of Solid Solutions of Scandium–Containing Garnets For Solid–State Lasers", Allerton Press, Inc. (1991).

Patent Abstracts of Japan, Pub. No. 2000119100, Apr. 25, 2000.

* cited by examiner

US 6,733,587 B2

PROCESS FOR FABRICATING AN ARTICLE COMPRISING A MAGNETO-OPTIC GARNET MATERIAL

PRIORITY

This application claims priority from U.S. provisional application Serial No. 60/327,415 filed Oct. 5, 2001.

BACKGROUND OF THE INVENTION

1. Field of the Invention

The invention relates to magneto-optic garnet materials having applications in optical devices such as isolators, circulators and interleavers.

2. Discussion of the Related Art

Co-assigned U.S. Pat. Nos. 5,608,570 and 5,801,875, the disclosures of which are hereby incorporated by reference, disclose magneto-optic garnet materials useful for Faraday rotator applications. As discussed therein, the disclosed materials exhibit highly desirable magnetic properties, including a substantially rectangular magnetization loop, relatively low saturation magnetization over a useful operating temperature range, and a relatively high switching field at least at room temperature. (FIG. 1 is representative of the properties of these materials.) These materials are referred to generally as latching garnet materials, due to their ability to remain in a magnetically saturated (i.e., single domain) state. However, the garnet materials disclosed in the above patents exhibited particularly advantageous properties, due to their ability to remain latched over a relatively broad temperature range, and their ability to be "hard" latched.

(As used herein: magnetization loop is the curve of magnetization vs. applied magnetic field; a magnetization loop is "substantially rectangular" if the width of the magnetization reversal is at most 10 Oe; the "switching field" ($H_s$) of the magnetization loop is the applied field at which the magnetization goes through zero ($H_s$ corresponds to the coercive field—$H_c$ of a conventional magnetization loop; "hard latching" means a switching field of 500 Oe or greater at least at room temperature.)

While the materials of the above-cited patents exhibit excellent properties, improvements in the materials and the processes for making the materials and articles incorporating the materials are always desired.

SUMMARY OF THE INVENTION

The invention relates to improvements in the production of high-performance latching magneto-optic garnet materials. It has been recognized that high-Europium magneto-optic garnets will offer superior properties in devices such as isolators, circulators and interleavers. However, formation of, e.g., $(BiEu)_3(FeGa)_5O_{12}$ on conventional, congruent composition, garnet substrates is difficult, due to poor lattice matching between the magneto-optic garnet and such conventional substrates. The invention addresses this problem.

The invention involves a process for forming an article, the process including steps of providing a substrate, and forming on the substrate a film of $(BiEu)_3(Fe_{5-y}(Ga_xAl_{1-x})_y)O_{12}$, where x is 0 to 1, and y is 0.8 to 1.2 (with y generally selected such that the film exhibits a saturation magnetization<100 G at room temperature). According to one aspect of the invention, the substrate is a single crystal material consisting essentially of a solid solution of two or more garnet materials, the substrate having a lattice parameter within 0.004 Angstrom of the lattice parameter of the $(BiEu)_3(Fe_{5-y}(Ga_xAl_{1-x})_y)O_{12}$, advantageously within 0.002 Angstrom, more advantageously within 0.001 Angstrom. By use of a solid solution of two or more garnets, e.g., two congruent garnet compositions, an acceptable lattice parameter is able to be attained. In another aspect, the substrate is a single crystal material consisting essentially of a solid solution of gadolinium scandium gallium garnet and gadolinium scandium aluminum garnet, or a solid solution of gadolinium scandium gallium garnet and terbium scandium gallium garnet. These combinations, in proper compositional ratios, are able to provide lattice parameters that facilitate formation of desirable, high-Eu magneto-optic garnets.

Garnets of the above formula in which x is 1 tend to provide highly desirable magnetic properties. Inclusion of aluminum is useful in some cases, however, because even a small amount of aluminum can modify the lattice parameter to an extent that widens the range of potential substrate materials.

DETAILED DESCRIPTION OF THE INVENTION

The rare earth iron garnets, RIG—$\{RE\}_3[Fe]_2(Fe)_3O_{12}$, are ferromagnetic. The octahedral and tetrahedral sites are anti-ferromagnetically coupled to one another with the difference in the number of sites providing a net moment of one $Fe^{3+}$ ion. The net magnetization of the garnet is given by $$M_s(T)=|\pm M_c(T)-M_a(T)+M_d(T)| \qquad (1)$$

where $M_c(T)$, $M_a(T)$ and $M_d(T)$ are the temperature dependent sublattice magnetizations of the dodecahedral, octahedral and tetrahedral sublattices respectively. The absolute value applies because the magnetization of the material is conventionally thought of as only being positive. When CGS magnetic units (Gauss) are used, the saturation magnetization of the material is $4\pi M_s$.

Doping on the iron (tetrahedral and octahedral) sites is typically used to change the saturation magnetization of the garnets, particularly in the prototype composition yttrium iron garnet (YIG—$Y_3Fe_5O_{12}$), which has a non-magnetic dodecahedral ion ($M_c(T)=0$). The diamagnetic ions Ga and Al have a strong substitutional preference for the tetrahedral site and can therefore be substituted for iron to reduce the saturation magnetization. This site preference varies entropically with temperature, but at typical film growth temperatures ~1.3 atoms per formula unit of Ga are required to produce a compensated $Y_3Fe_{3.7}Ga_{1.3}O_{12}$ garnet with zero saturation magnetization (effectively an antiferromagnet). Because diamagnetic substituents dilute the iron lattice, they also somewhat reduce the Curie temperature of the garnet.

Figure 1:
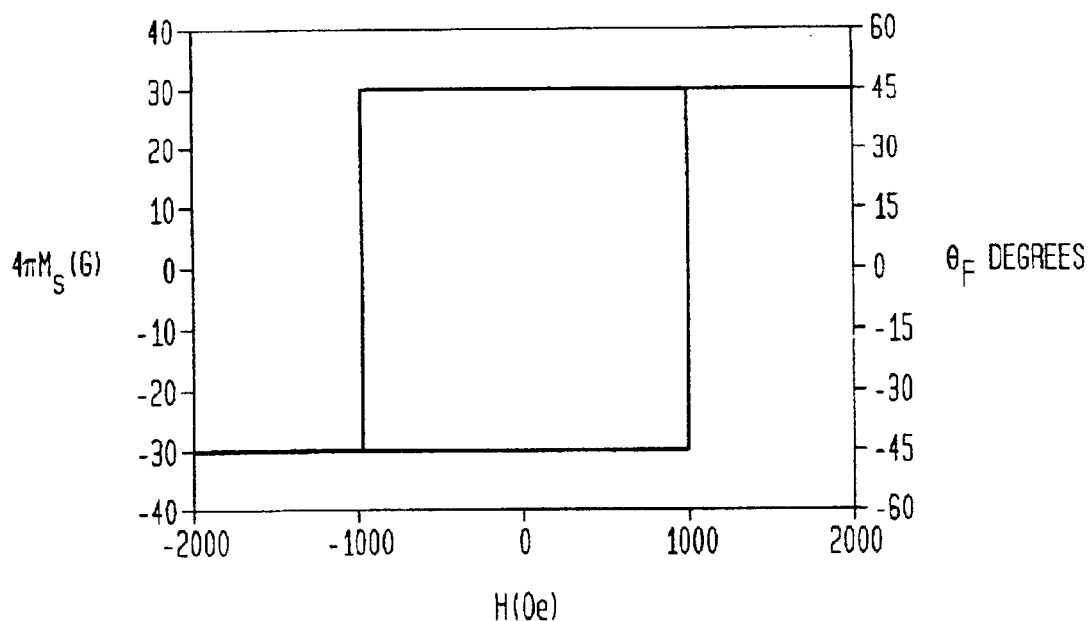
FIG. 1 is representative of the properties of latching garnet material of the type disclosed in U.S. Pat. Nos. 5,608,570 and 5,801,875.
Figure 2:
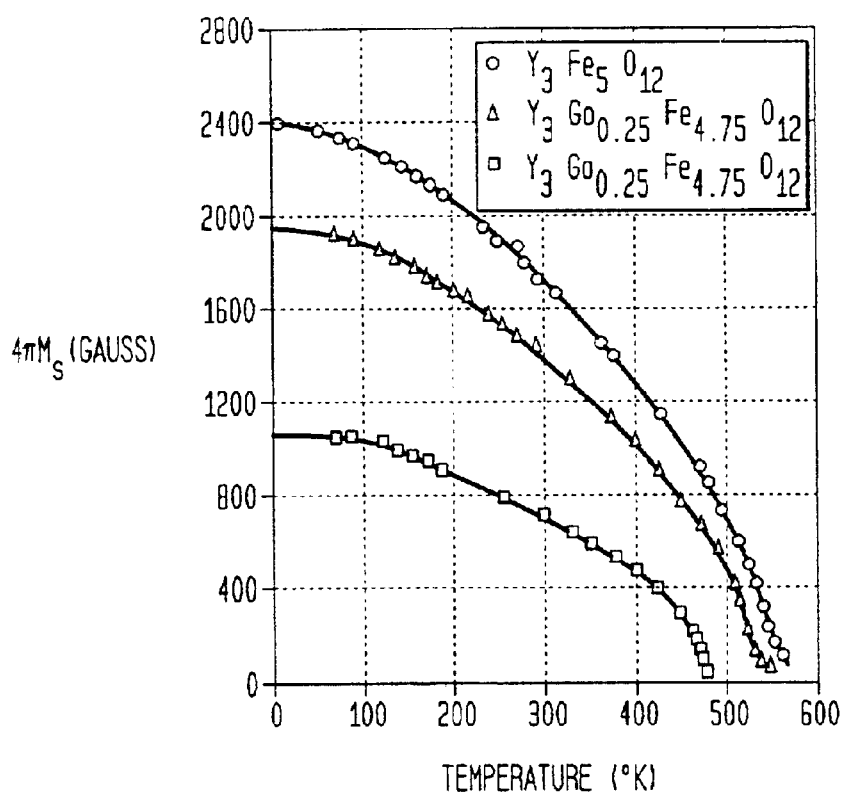
FIG. 2 shows the effect of gallium doping on the temperature dependence of saturation magnetization in yttrium iron garnets.

The effect of tetrahedral Ga doping on the magnetic properties (saturation magnetization, $4\pi M_s$ and Curie temperature, $T_C$) of Bi:YIG is given in Table I below. (See V. J. Fratello et al., *J.Appl.Phys.* 60, 718 (1986).) (Gallium doping also slightly reduces the lattice parameter.) It is apparent from these data that, while gallium doping is required to reduce the saturation magnetization, it should also be kept relatively low to keep the Curie temperature as high as possible. This effect of gallium doping is reflected in FIG. 2, which shows saturation magnetization vs. temperature. (See also *Handbook of Microwave Ferrite Materials*, ed. W. H. von Aulock, Academic Press, 1965, pp. 70–73, 86, 153, 163, 174).

TABLE I

Effect of Gallium doping on Bi:YIG magnetic properties.

| Ga (atom/formula unit) | $4\pi M_s$ (G) | $T_C$ (° C.) |
|---|---|---|
| 0 | 1920 | 281 |
| 0.23 | 1535 | 256 |
| 0.47 | 1140 | 230 |
| 0.66 | 800 | 206 |
| 0.84 | 510 | 183 |
| 0.98 | 350 | 161 |
| 1.10 | 200 | 141 |

Aluminum substitution for iron works similarly, but has slightly less preference for the tetrahedral site so it is less effective per formula unit in reducing the saturation magnetization and has a greater tendency to reduce the Curie temperature (see *Handbook of Microwave Ferrite Materials*, infra). Aluminum does, however, have the advantage of reducing the lattice parameter more than gallium does.

The coupling of the rare earth c-lattice to the iron moment is complex and encompasses four different cases:

Ions with no net angular momentum, such as Y, La, Sm and Lu, introduce no significant magnetization to the c-lattice. There may be some slight variation because the variation of ionic size changes the coupling in the iron lattice. (See *Handbook of Microwave Ferrite Materials*, infra; S. Geller, *Physics of Magnetic Garnets*, ed. A. Paoletti, North-Holland, 1978, pp. 9–22; and J. Smit and H. P. J. Wijn, *Ferrites*, Wiley, 1959, pp. 212–15.)

Figure 3:
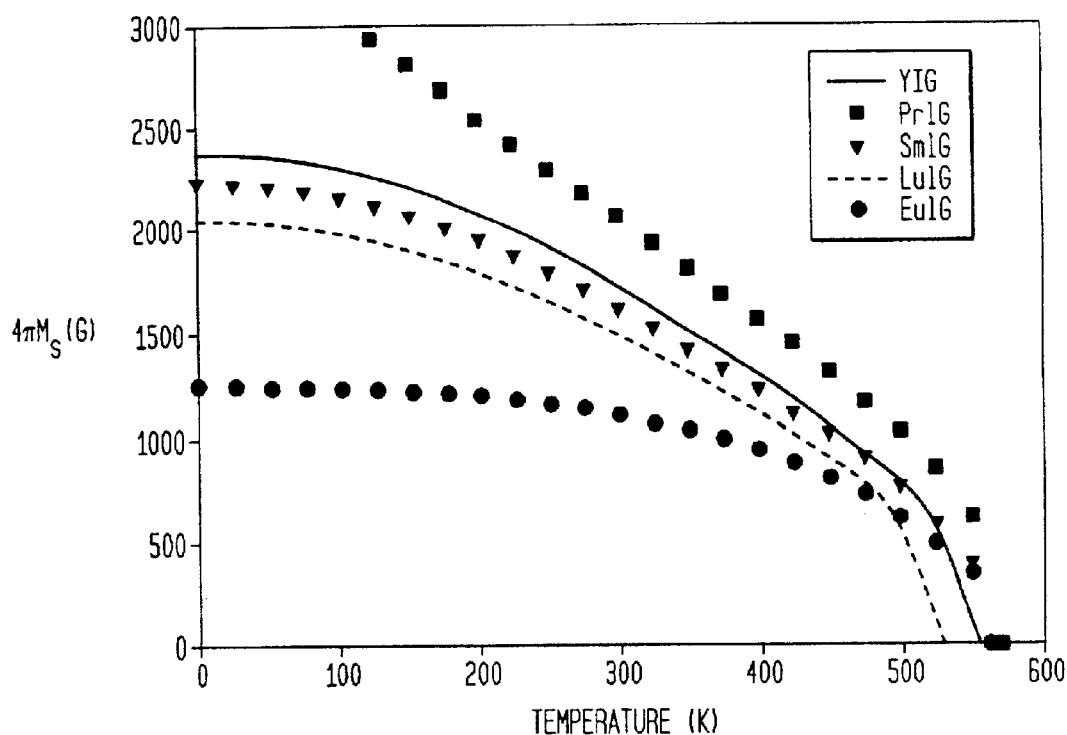
FIG. 3 shows the temperature dependence of the saturation magnetization, $4\pi M_s$, of the pure iron garnets that contain neutral and light rare earths.

Light rare earths (Ce to Pm) have less than half filled f-shells. As a result their c-lattice moment aligns ferromagnetically with the tetrahedral lattice and provides a proportional positive contribution to the saturation magnetization. The temperature dependence of the saturation magnetization, $4\pi M_s$, of the pure iron garnets that contain neutral and light rare earths is shown by FIG. 3. (See *Handbook of Microwave Ferrite Materials*, and S. Geller, infra.)

Figure 4:
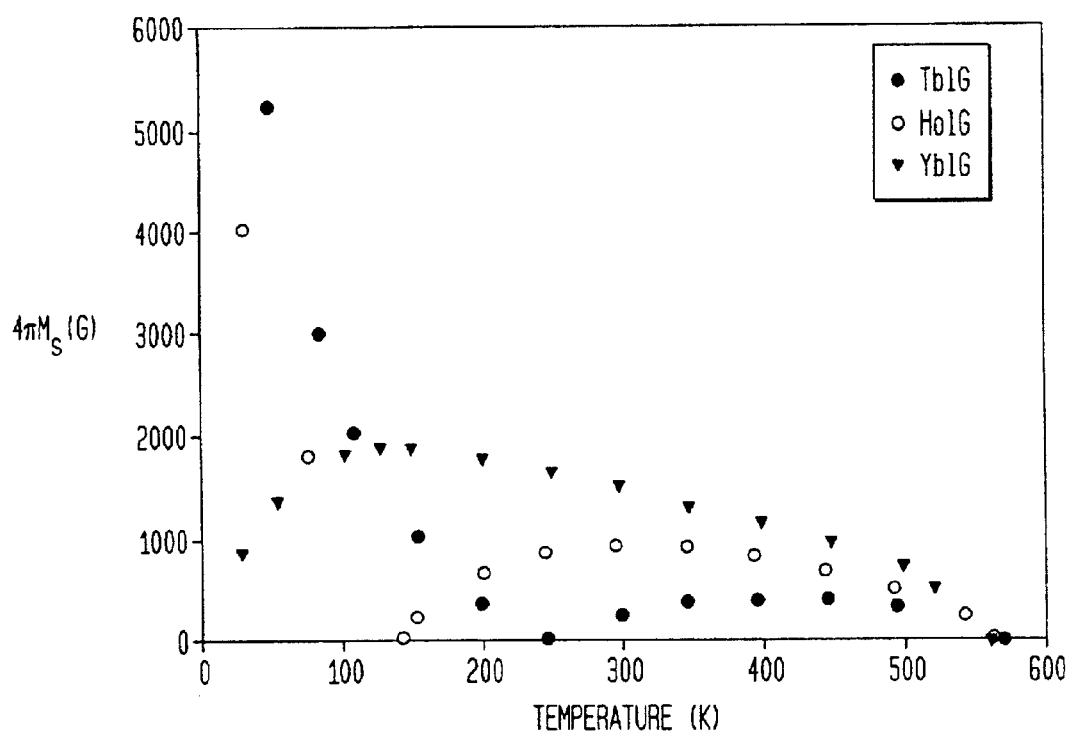
FIG. 4 shows the temperature dependence of the saturation magnetization for rare earth iron garnets, where the rare earth is Tb, Ho, and Yb.

Heavy rare earths (Gd to Yb) have more than half filled f-shells; as a result their moments align antiferromagnetically to the tetrahedral iron lattice. The large value of these ions' spin angular momentum causes the rare earth contribution to be very large at low temperatures, but the weak coupling to the iron lattice causes the c-lattice magnetization to vary sharply with temperature, approximately as 1/T. This contribution dominates the saturation magnetization at low temperatures, but is negligible at high temperatures resulting in magnetic compensation (saturation magnetization equal to zero) at some temperature below the Curie temperature where the c-site contribution exactly balances the net iron lattice contribution. The magnitude of the temperature dependent rare earth moment is highest for Gd and decreases steadily through the heavy rare earths. Curves for Tb, Ho and Yb are shown in FIG. 4. The relative strength of this 1/T contribution may be judged from the difference between the RIG and YIG saturation magnetizations at room temperature as indicated in the table below. (See P. Hansen et al., Landolt-Bornstein New Series, Group III, Vol. 12, Part a, *Garnets and Perovskites*, ed. K-H. Hellwege, Springer-Verlag, 1978, pp. 22–23; *Handbook of Microwave Ferrite Materials;* S. Geller, infra; and J. Smit and H. P. J. Wijn, infra.)

TABLE II

Effect of Rare Earth on room temperature saturation magnetization

| Rare Earth (R) | $4\pi M_s$(YIG)–$4\pi M_s$(RIG) (G) |
|---|---|
| Gd | 1743 |
| Tb | 1600 |
| Dy | 1420 |
| Ho | 920 |
| Er | 560 |
| Tm | 400 |
| Yb | 240 |

As noted in U.S. Pat. No. 5,801,875, Eu is an anomalous case because its first excited state has a low energy and is significantly populated. This results in a c-lattice magnetization imposed by, proportional to, and strongly antiferromagnetically coupled to the tetrahedral magnetization. (See W. P. Wolf and J. H Van Vleck, Phys. Rev., 118, 1490 (1960). This can be seen in FIG. 3. This is particularly interesting because Eu has a uniquely low temperature dependence of saturation magnetization.

Figure 5:
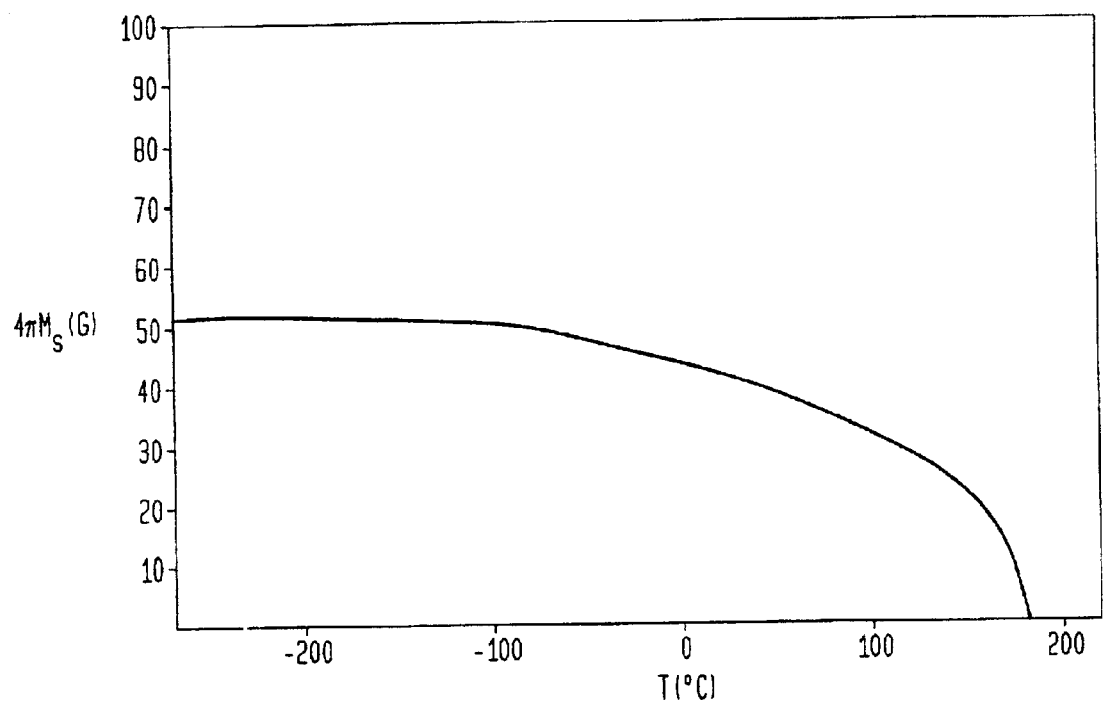
FIG. 5 shows a theoretical saturation magnetization curve for $Bi_{1.2}Eu_{1.8}Fe_4Ga_1O_{12}$.

Thus, a composition high in Eu would be desirable, such as $(BiEu)_3(FeGa)_5O_{12}$, or, even more specifically, $Bi_{1.2}Eu_{1.8}Fe_4Ga_1O_{12}$. A theoretical saturation magnetization curve for this latter material is shown in FIG. 5. Such a composition would exhibit highly desirable magnetic properties, similar to, if not better than, those of the garnets disclosed in the above-cited patents. In particular, a film of this composition would exhibit a substantially rectangular magnetization loop, with a saturation magnetization, in absolute value, less than 100 G, and a switching field, in absolute value, higher than the saturation magnetization, in a magnetic field applied parallel to the normal to the major surface of the film. These conditions would be met over an operating temperature range, typically −40° C. to +85° C. In addition, the switching field, in absolute value, would advantageously be at least 200 Oe over this temperature range, more advantageously at least 500 Oe over the temperature range. Typically, the switching field, in absolute value, will be 500 Oe or higher, at least at room temperature.

Growing magneto-optic garnet material films for Faraday rotators generally requires a lattice-matched substrate, to perform liquid phase epitaxy (LPE). Moreover, those in the art seek a congruently-melting substrate material, in order to have a highly uniform substrate for the subsequent LPE. A currently-used substrate is calcium-magnesium-zirconium substituted gadolinium gallium garnet (CMZ:GGG), whose composition is $(Gd_{2.68}Ca_{0.32})(Ga_{4.04}Mg_{0.32}Zr_{0.64})O_{12}$, and which has a lattice parameter of 12.498 Angstroms (various literature sources present this lattice parameter as being anywhere from 12.494 to 12.499 Angstroms). It is difficult, however, to grow $(BiEu)_3(FeGa)_5O_{12}$ on such a substrate, due to the lattice mismatch. See, e.g., the lattice parameters in Table III below.

TABLE III

Lattice parameters of pure rare earth iron garnets $R_3Fe_5O_{12}$.

| R | LP (angstrom) |
|---|---|
| Y | 12.376 |
| La | 12.767 |
| Pr | 12.646 |
| Nd | 12.596 |
| Sm | 12.529 |
| Eu | 12.497 |
| Gd | 12.470 |
| Tb | 12.436 |
| Dy | 12.405 |
| Ho | 12.376 |
| Er | 12.349 |
| Tm | 12.325 |
| Yb | 12.302 |
| Lu | 12.283 |
| Bi | 12.623 |

Thus, to achieve adequate yields, alternative substrate materials are required. According to the invention, Eu-containing garnet materials are formed on substrates of solid solution garnet materials, the substrates being single crystal, advantageously of substantially uniform composition, and generally non-magnetic. (Substantially uniform composition indicates that the boule from which the substrate is taken has a uniformity of lattice parameter of within 0.002 Angstrom from top to bottom, over the full diameter of the grown boule.) Solid solutions of congruent compounds are generally used, with the desired lattice parameters attained by controlling the relative proportions of the two or more garnet materials. For example, to form a film of $(BiEu)_3(FeGa)_5O_{12}$, it is desirable to use a single-crystal, garnet solid solution substrate having a lattice parameter of 12.53 to 12.555 Angstroms.

According to the invention, it is contemplated to form a film of a $(BiEu)_3(Fe_{5-y}(Ga_xAl_{1-x})_y)O_{12}$ magneto-optic garnet material (where x is 0 to 1 and y is 0.8 to 1.2) on a garnet solid solution substrate having a lattice parameter within 0.004, advantageously within 0.002, more advantageously within 0.001, Angstrom of the lattice parameter of the material. Better magnetic properties are attained with an aluminum-free material, which is advantageous for high-performance optical devices. But aluminum is useful in some cases in that it allows some additional adjustment to lattice parameter, which in turn may allow a wider group of substrate materials to be used.

Examples of suitable substrates for forming high-Eu compositions are GSGG—GSAG, a solid solution of the congruent compounds Gadolinium Scandium Gallium Garnet and Gadolinium Scandium Aluminum Garnet, and GSGG—TSGG, a solid solution of the congruent compounds Gadolinium Scandium Gallium Garnet and Terbium Scandium Gallium Garnet. (For discussions of these garnet materials, see, V. J. Fratello, C. D. Brandle and A. J. Valentino, *J. Cryst. Growth,* 80, 26 (1987); U.S. Pat. No. 4,802,180; C. D. Brandle and R. L. Barns, *J. Cryst. Growth,* 20, 1 (1973); and S. Yu. Zinov'ev, L. I. Krutova, S. V. Ulanova and V. B. Glushkova, *Zhurnal Prikladnoi Khimii,* 62, 2589 (1989).)

GSGG—GSAG is a solid solution mainly on the garnet tetrahedral site between two 3+ cations of different sizes. A solid solution of 90% GSGG and 10% GSAG, for example, produces substrates of a useful lattice parameter for growing $Bi_{1.2}Eu_{1.8}Fe_4Ga_1O_{12}$ by LPE.

GSGG—TSGG is a solid solution on the garnet dodecahedral site between two adjacent rare earths with very similar chemical behavior. A solid solution of 62.5% GSGG and 37.5% TSGG, for example, produces substrates of a useful lattice parameter for growing $Bi_{1.2}Eu_{1.8}Fe_4Ga_1O_{12}$ by LPE.

The magneto-optic garnet films are generally formed on the substrates by LPE, which is a well-known process. After LPE, typical processing steps to attain magneto-optic garnet films suitable for incorporation into optical devices include dividing the substrate and magneto-optic garnet film into square slabs, removing the substrate (typically with a mechanical technique), lapping and polishing the resulting free-standing garnet film, coating the polished film with an anti-reflection coating, and dicing the slabs into chips. Various inspections and tests are then performed to ensure the chips are acceptable for devices. The chips are magnetized to the single-domain state needed for device operation. The magneto-optic garnet chips are then capable of being incorporated into devices such as isolators, circulators or interleavers, where their ability to provide Faraday rotation contributes to the performance of an optical system.

GSGG—TSGG and GSGG—GSAG substrates are capable of being formed, using conventional Czochralski growth techniques, as follows. The starting materials are 99.99% pure or better. The $Gd_2O_3$, $Sc_2O_3$, and $Ga_2O_3$ powders are dried at 1100° C. for 8 hours.

For the GSGG—TSGG, 157.2 g $Gd_2O_3$, 92.1 g $Tb_4O_7$, 59.4 g $Sc_2O_3$ and 141.2 g $Ga_2O_3$ are mixed and pressed at 12000 psi. The charge is melted in a 2" diameter by 2" deep Iridium crucible. The melt is seeded with a <111> oriented GSGG—TSGG seed. The boule is pulled at a speed of 3 mm/hr and rotated at 15–40 rpm. The resulting crystal is about 28 mm in diameter with a final weight of 312 g. The growth atmosphere is 1.8% $O_2$. Substrates are then capable of being sliced from the crystal.

For the GSGG—GSAG, 253.8 g of $Gd_2O_3$, 62.1 g of $Sc_2O_3$, and 127.0 g of $Ga_2O_3$ are mixed together and pressed at 12000 psi. The charge is added to a 2" diameter by 2" deep Iridium crucible along with 7.1 g of $Al_2O_3$ single crystal pieces ($Al_2O_3$ powder may also be used and mixed with the balance as above). The melt is seeded with a <111> oriented GSGG—GSAG seed. The boule is pulled at a speed of 3 mm/hr and rotated at 40 rpm. The resulting crystal is about 28 mm in diameter with a final weight of 350 g. The growth atmosphere is 1.8% $O_2$. Substrates are then capable of being sliced from the crystal.

A $(BiEu)_3(FeGa)_5O_{12}$ film is capable of being formed on such substrates as follows. Commercially available oxides of the relevant metals (99.99% purity or better) are weighed, mixed, melted and stirred in a platinum crucible. The growth procedures are substantially the same as described in U.S. Pat. Nos. 5,608,570 and 5,801,875, with the composition adjusted accordingly. (Techniques for liquid phase epitaxy of thick film garnet materials are found, for example, in V. J. Fratello and R. Wolfe, *Handbook of Thin Film Devices,* Vol. 4: Magnetic Thin Film Devices, ed. M. H. Francombe and J. D. Adam, Academic Press, 2000, pp. 93–141.) After attainment of equilibrium at 850° C., the melt is cooled below its saturation temperature. Growth is commenced by contacting the substrate so that one side only is wetted. During growth the substrate is rotated at ~40 rpm and the direction of rotation may be reversed periodically (1–5 revolutions) for improved stirring of the melt during growth. After attainment of the desired thickness (typically above 100 μm), the substrate with the epitaxially grown magnetic garnet layer thereon is withdrawn from the melt, the flux is spun off, and the combination is allowed to cool to room temperature. The resulting garnet wafer is divided into 11.5×11.5 mm slabs. For each of these slabs, the substrate is removed by mechanical means and the free-standing magnetic garnet film is lapped and polished to the desired thickness and finish by a combination of mechanical and chemical-mechanical techniques. The slabs are coated with an anti-reflection coating, tested to specification and diced into suitable size chips by a dicing process that maintains good quality edges for device assembly (for example, 1 mm×1 mm chips). Chips are generally subjected to a visual inspection for optical defects and edge chipping. The chips are magnetized to the single-domain state required for device operation in a field exceeding 4000 Oe for incorporation in an optical isolator or other non-reciprocal optical device such as a circulator or interleaver.

Other embodiments of the invention will be apparent to those skilled in the art from consideration of the specification and practice of the invention disclosed herein.

What is claimed is:

1. A process for forming an article, comprising the steps of:

providing a substrate; and forming on the substrate a film of $(BiEu)_3(Fe_{5-y}(Ga_xAl_{1-x})_y)O_{12}$, where x is 0 to 1 and y is 0.8 to 1.2, wherein the substrate is a single crystal material consisting essentially of a solid solution of two or more garnet materials, the substrate having a lattice parameter within 0.004 Angstrom of the lattice parameter of the $(BiEu)_3(Fe_{5-y}(Ga_xAl_{1-x})_y)O_{12}$ film.

2. The process of claim 1, wherein x is 1, and the substrate lattice parameter is 12.53 to 12.555 Angstroms.

3. The process of claim 1, wherein the substrate is of substantially uniform composition.

4. The process of claim 1, wherein the substrate consists essentially of a solid solution of gadolinium scanduim gallium garnet and gadolinium scandium aluminum garnet, or a solid solution of gadolinium scandium gallium garnet and terbium scandium gallium garnet.

5. An article comprising the film according to claim 4.

6. The process of claim 1, wherein y is selected such that the film exhibits a saturation magnetization, in absolute value, less than 100 G at least at room temperature.

7. The process of claim 1, further comprising the steps of:

processing the film to form chips; and incorporating at least one chip into a device.

8. The process of claim 1, wherein the lattice parameter is within 0.002 Angstrom of the lattice parameter of the $(BiEu)_3(Fe_{5-y}(Ga_xAl_{1-x})_y)O_{12}$ film.

9. An article comprising the film according to claim 1.

10. A process for forming an article, comprising the steps of:

providing a substrate; and forming on the substrate a film of $(BiEu)_3(Fe_{5-y}(Ga_xAl_{1-x})_y)O_{12}$, where x is 0 to 1 and y is 0.8 to 1.2, and wherein y is selected so that the film exhibits a substantially rectangular magnetization loop, a saturation magnetization, in absolute value, less than 100 G, a switching filed, in absolute value, higher than the saturation magnetization, in a magnetic filed applied parallel to the normal to the major surface of the film, over an operating temperature range of −40° to +85° C., wherein the substrate is a single crystal material consisting essentially of a solid solution of two or more garnet materials, the substrate having a lattice parameter within 0.004 Angstrom of the lattice parameter of the $(BiEu)_3(Fe_{5-y}(Ga_xAl_{1-x})_y)O_{12}$ film.

11. The process of claim 10, wherein the film exhibits a switching field, in absolute value, of at least 200 Oe over the operating temperature range, and a switching field, in absolute value, of at least 500 Oe at least at room temperature.

12. The process of claim 11, wherein the film exhibits a switching field, in absolute value, of 500 Oe or higher over the operating temperature range.

13. A process for forming an article, comprising the steps of:

providing a substrate; and forming on the substrate a film of $(BiEu)_3(Fe_{5-y}(Ga_xAl_{1-x})_y)O_{12}$, where x is 0 to 1 and y is 0.8 to 1.2, wherein the substrate is a single crystal material consisting essentially of a solid solution or gadolinium scandium gallium garnet and gadolinium scandium aluminum garnet, or a solid solution of gadolinium scandium gallium garnet and terbium scandium gallium garnet.

14. The process of claim 13, where x is 1.

15. The process of claim 14, wherein the substrate lattice parameter is 12.53 to 12.555 Angstroms.

16. The process of claim 15, wherein the substrate is of substantially uniform composition.

17. The process of claim 13, wherein y is selected such that the film exhibits a saturation magnetization, in absolute value, less than 100 G at least at room temperature.

18. The process of claim 13, further comprising the steps of:

processing the film to form chips; and incorporating at least one chip into a device.

19. A process for forming an article, comprising the steps of:

providing a substrate; and forming over the substrate a film of $(BiEu)_3(Fe_{5-y}(Ga_xAl_{1-x})_y)O_{12}$, where x is 0 to 1 and y is 0.8 to 1.2, wherein y is selected so that the film exhibits a substantially rectangular magnetization loop, a saturation magnetization, in absolute value, less than 100 G, a switching field, in absolute value, higher than the saturation magnetization, in a magnetic field applied parallel to the normal to the major surface of the film, over an operating temperature range of −40° to +85° C., wherein the substrate is a single crystal material consisting essentially of a solid solution of gadolinium scandium gallium garnet and gadolinium scandium aluminum garnet, or a solid solution of gadolinium scandium gallium garnet and terbium scandium gallium garnet.

20. The process of claim 19, wherein the film exhibits a switching field, in absolute value, of at least 200 Oe over the operating temperature range, and switching field, in absolute value, of at least 500 Oe at least at room temperature.

21. The process of claim 20, wherein the film exhibits a switching field, in absolute value, of 500 Oe or higher over the operating temperature range.

* * * * *